United States Patent [19]

Tommasi et al.

[11] Patent Number: 5,061,759
[45] Date of Patent: Oct. 29, 1991

[54] PROCESSING-COADJUVATING ADDITIVES FOR RUBBERS VULCANIZABLE BY MEANS OF PEROXIDES

[75] Inventors: Giulio Tommasi; Raffaele Ferro, both of Milan; Gianna Cirillo, Genova, all of Italy

[73] Assignee: Ausimont S.p.A., Milan, Italy

[21] Appl. No.: 679,127

[22] Filed: Mar. 28, 1991

Related U.S. Application Data

[63] Continuation of Ser. No. 549,554, Jul. 9, 1990, abandoned, which is a continuation of Ser. No. 248,323, Sep. 22, 1988, abandoned, which is a continuation of Ser. No. 917,550, Oct. 10, 1986, abandoned.

[30] Foreign Application Priority Data

Oct. 17, 1985 [IT] Italy .............................. 22532 A/85

[51] Int. Cl.$^5$ ................................................ C08F 8/20
[52] U.S. Cl. .............................. 525/326.3; 525/326.4; 525/359.3; 525/387
[58] Field of Search ............... 525/326.3, 326.4, 359.3, 525/387

[56] References Cited

U.S. PATENT DOCUMENTS 4,500,739  2/1985  Caporiccio et al. ................ 568/677

OTHER PUBLICATIONS

Apotheker et al., "Curing of Fluoroelastomers by Peroxides", Rubber Chemistry and Technology, vol. 55, pp. 1005–1018, 1982.

*Primary Examiner*—Bernard Lipman
*Attorney, Agent, or Firm*—Stevens, Davis, Miller & Mosher

[57] ABSTRACT

The use of liquid neutral perfluoropolyethers in amounts below 1 part by weight per 100 parts by weight of elastomer, and of derivatives thereof having brominated end groups, in amounts of 0.01 to 5 parts by weight per 100 parts by weight of elastomer, having a molecular weight ranging from 500 to 10,000, as additives in rubber mixes vulcanizable with peroxides, in order to improve the processability in the extrusion and the detachability of the vulcanized article from the molding dies.

6 Claims, No Drawings

PROCESSING-COADJUVATING ADDITIVES FOR RUBBERS VULCANIZABLE BY MEANS OF PEROXIDES

This application is a continuation of application Ser. No. 07/549,554, filed July 9, 1990, now abandoned, which in turn is a continuation of application Ser. No. 07/248,323, filed Sep. 22, 1988, now abandoned, which is a continuation of application Ser. No. 06/917,550, filed Oct. 10, 1986, now abandoned.

DESCRIPTION OF THE INVENTION

This invention provides rubbers which are vulcanizable by means of peroxides and exhibit improved processability properties such as a better extrudability and a better detachability of the vulcanized article from the molding dies utilized in injection molding or compression molding technologies.

The invention is based on the use of additives of the class of perfluoropolyethers and derivatives thereof having brominated end groups, comprised in the following formulas:

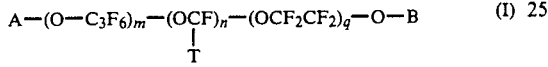

$$A-(O-C_3F_6)_m-(OCF)_n-(OCF_2CF_2)_q-O-B \quad (I)$$
$$\phantom{A-(O-C_3F_6)_m-(OCF)_n}|\phantom{-(OCF_2CF_2)_q-O-B}$$
$$\phantom{A-(O-C_3F_6)_m-(OCF)_n}T$$

in which: $T=F$ or $CF_3$; m, n and q are integers, zero included, $m+n+q$ ranges from 2 to 200; $m/(n+q)$ is $\leq 50$ when n and/or q are different from zero; when $m=0$, $q/n$ is $\geq 0.2$ and $\leq 20$ when n is other than zero; when $q=0$, $m/n$ ranges from 1 to 50 when n is other than zero; A and B, either like each other or different from each other, are selected from the groups $-CF_2X$, $-CF_2-CF_2-X$,

$-CF-X$,
|
$CF_3$ $-CF_2-CFX-CF_3$, $-COF$, $-CF_2-COF$, and

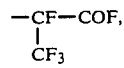

$-CF-COF$,
|
$CF_3$

X being bromine or fluorine; when m is different from zero, X can be bromine only in A or in B.

Particularly suitable are the liquid products with a mean molecular weight ranging from 500 to 10,000, the preferred being those which contain at least one bromine atom in at least one of the end groups A and B.

Perfluoropolyethers of formula:

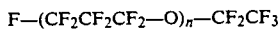

$$F-(CF_2CF_2CF_2-O)_n-CF_2CF_3 \quad (II)$$

where n is an integer greater than 2 and lower than 200, prepared according to the method described in European patent No. 148,482, may also be used.

It is possible also to use mixtures of neutral compounds of formula (I) and/or formula (II) with the brominated compounds of formula (I). For neutral compounds it is intended a perfluoropolyether having terminal groups without bromine.

Products which are suited as additives according to the invention and comprised in formula (I) are the perfluoropolyethers prepared by photochemical oxidation of $C_2F_4$ or $C_3F_6$, commercially known as Fomblin ®Z and Fomblin ®Y and the perfluoropolyethers of the class of the polymers derived from perfluoropropene-epoxide, commercially known as Krytox ®. It is possible to utilize also perfluoropolyethers prepared by photochemical oxidation of $C_2F_4$ and $C_3F_6$.

Particularly suitable have proved to be brominated perfluoropolyether derivatives prepared according to the processes described in Italian patent applications No. 19653 A/85 and No. 22517 A/85, and obtained as mixtures of products at different degrees of bromination.

The additives according to the present invention are dispersed by mixing in rubbers vulcanizable by means of peroxides or by means of mixed peroxy and ionic vulcanizing systems or in mixtures thereof, in order to improve their processability.

As is well known, vulcanizing systems based on peroxides are capable of vulcanizing many types of rubbers, imparting to the vulcanized articles good properties with respect to stability to heat, to chemical agents, and to mechanical stresses.

The rubber mixes vulcanizable with peroxides, per se known in the art, generally consist of the following components:

RUBBER

As types of elastomers vulcanizable with peroxides there may be cited: natural rubber, ethylene/propylene/diene copolymers, butadiene/styrene rubbers, butadiene/acrylonitrile rubbers, silicone rubbers, fluoroelastomers containing peroxy vulcanization sites, mixtures of rubbers of which at least one is vulcanizable with peroxides or with mixed vulcanization systems, and in particular mixtures of a fluoroelastomer based on $CH_2=CF_2$ and of an elastomeric polymer $C_2F_4/C_3H_6$, of the type of AFLAS ®.

PEROXY STARTER (VULCANIZING AGENT)

This consists of an organic peroxide, such as for example: benzoylperoxide, dicumyl peroxide, 2,5-dimethyl-2,5-di(t.butylperoxy) hexane, $\alpha, \alpha'$ bis(t.butylperoxy)-diisopropylbenzene, aliphatic or cyclic bis-peroxycarbonates.

VULCANIZING COAGENT

This consists of an unsaturated di- or tri-functional compound such as e.g., triallylcyanurate, triallylisocyanurate, divinylbenzene, m-phenylene-bis(-maleimide).

REINFORCING FILLERS

Carbon black, silica, etc.

Acid acceptors, such as e.g. the oxides of lead, zinc, calcium, magnesium.

PROCESSING COADJUVANTS

These coadjuvants are products endowed with plasticizing or lubricating properties, such as e.g., vegetable waxes, low molecular weight polyethylenes, various stearates, polyesters, octadecylamines, and the like.

The use of such coadjuvants becomes necessary owing to the poor extrudability characteristics of the mixtures and to the phenomena of adhesion to the dies and soiling of them.

The conventional processing coadjuvants give rise, in a few cases, to problems of interference with the peroxy vulcanization system, and of a non-satisfactory appearance of the surface of the molded piece. Furthermore, in the specific case of the fluoroelastomers, a "thermal stabilization" (post-vulcanization) at temperatures of from 200° to 250° C. for a time ranging from 10 to 30 hours is absolutely necessary to impart to the fluoroelastomers the desired properties of stability with respect to heat, to chemical agents, and to solvents. During this operation, the common plasticizing agents (glycols, stearates, organic phosphates, oleates, phthalates etc.) volatilize and/or decompose. This causes a remarkable degradation of the mechanical properties of the final article, in particular:

an excessive increase in hardness, a decay of the stability to compression set, a decay of the elastic characteristics (low elongation value and high modulus value), a low thermal stability which precludes the use thereof in severe applicative conditions (>180° C.).

In conclusion, the advantages achievable during the processing result in unacceptable shortcomings in the final article.

Thus, the use of plasticizing or lubricating agents is limited to small amounts (1-3 p.h.r.), i.e., pounds per hour of rubber, which do not sensibly alter the final properties of the vulcanized article, but, on the other hand, are insufficient to meet the aforesaid requirements.

In particular, it has been ascertained that the utilization of perfluorosilicone oils permits the hardness to be lowered by 4-5 points, but exhibits however some difficulties as regards the admixing to and the incorporation into the fluoroelastomer. Furthermore, a reduction in the vulcanization rate and a worsening of the compression set value and thermal stability value can be observed.

The use of fluorinated polymers having a very low molecular weight and the consistency of waxes, such as Viton LM produced by DuPont, was adopted in order to impart better rheological characteristics to the mixtures, and in particular during extrusion. In this way it is possible to obtain manufactured articles of large size and with complicated profiles. However, the use of such a "plasticizer" in amounts of 10-20 parts by weight for 100 parts of fluoroelastomer is possible only with conventional vulcanizing systems, while it is not consistent with vulcanizing systems based on peroxides. The result thereof is a worsening of the stability with respect to heat, to chemical agents, to solvents and oils, and of the compression set value.

Surprisingly, by using the additives according to the present invention in amounts between 0 and 1 part by weight when the additive is neutral, and ranging from 0.01 to 5 parts by weight per 100 parts of rubber when the additive is brominated, and preferably up to 3 parts by weight in the case of additives having a mean molecular weight equal to or higher than 2,500, and up to 1.5 parts by weight in the case of additives having a mean molecular weight below 2,500, mixes were obtained—the other formulation elements remaining the same (rubber, starter, cross-linking co-agent, acidity acceptors)—exhibited a better behavior as regards both processability by means of extrusion and the detaching of the vulcanized article from the dies.

The use of high molecular weight additives improves in particular the processability in terms of yield and appearance of the extrudate, while the lower molecular weight additives more easily migrate to the surface, thus imparting in particular an excellent detachability of the vulcanized article from the molding die. For this reason, the amount of these low molecular weight additives are to be limited in order to prevent greasiness phenomena or, in the case of a high bromine functionality, a sensible interference with the vulcanization process.

In fact, if it is operated with the proper amounts of additives according to this invention, these additives do not sensibly interfere with the vulcanizing system: actually, vulcanization tests carried out according to standard ASTM D 2084 with an oscillating-disc rheometer (Monsanto), did not show significant differences with regard either to the rate or the vulcanization yield. Conversely there was oserved a lowering of the minimum torque, which means a better processability of the mixture.

Furthermore, the bromine-containing additive chemically binds to the elastomeric chain during the vulcanization process.

In fact, if the mixture containing the additive is subjected to extraction tests with $CFCl_2$—$CF_2Cl$ as solvent, the additive is recovered in the extraction liquid. Conversely, if the additive-containing mixture is vulcanized, a subsequent extraction with the same solvent does not lead to the recovery in the liquid of the additive.

This, in practice, leads to a further improvement: actually, the final article retains in the long run an excellent surface appearance and does not exhibit greasiness phenomena.

The use of the additives according to the present invention turns out to be particularly suitable for the fluoroelastomers in general, such as for example the copolymers of $CH_2=CF_2$ with $C_3F_6$ or with $C_3F_6+C_2F_4$ and containing peroxy crosslinking sites, the copolymers of $C_2F_4$ with propylene or with perfluoroalkyl-perfluorovinyl ethers (in particular methylvinyl] ether) containing, in the latter case, a cure site monomer, terpolymers of $C_3F_6$, vinylidene fluoride and perfluoroalkyl-perfluorovinyl ether (in particular methylvinyl ether) containing a cure site monomer.

The following examples are given merely to illustrate the applicative possibilities of the invention.

EXAMPLES 1-10

By means of the usual mixing techniques there were prepared rubber mixtures comprising the ingredients indicated in Table 1. With the mixes so prepared, the tests and determinations indicated in said Table 1 were carried out.

Ingredients Used in the Mixtures

Elastomer 1: $CH_2=CF_2/C_3F_6/C_2F_4$ terpolymer in the molar ratio 2/1/1 containing as a cure site monomer a brominated olefin, having a Mooney viscosity ML (1+4) at 100° C.=104 and a total bromine content of 3,500 ppm (VITON ®GF).

Elastomer 2: $CH_2=CF_2/C_3F_6$ copolymer in a molar ratio 3.5/1 and containing as a cure site monomer a brominated olefin, having a Mooney viscosity ML (1+4) at 100° C.=109 and a total bromine content 2,000 ppm (FLUOREL ® 2480).

Elastomer 3: $C_2F_4/C_3F_6$ copolymer in a molar ratio 1/1, having a Mooney viscosity ML (1+4) at 100° C.=130 (AFLAS®). Luperco ® 101 XL=2,5-dimethyl-2,5-di(terbutylperoxy)-hexane: product at 45% by weight, with 55% of inert filler.

TAIC: triallylisocyanurate.

Black MT: carbon black for rubbers (ASTM N 990)

Additive 1: Perfluoropolyether from hexafluoropropene, brominated at the end group, containing on the average about 1 bromine atom per molecule (functionality: about 1), having a viscosity of 30 cSt at 20° C. and a molecular weight of about 1,220.

Additive 1 was prepared as follows: Into a cylindrical photochemical reactor having an optical path of 0.5 cm, equipped with a coaxial quartz sheath for housing a mercury vapor lamp, type Hanau TQ150) or a noble gas (for example Xenon) discharge lamp, type PEK, INC X 75, equipped with a magnetic stirrer, a reflux condenser, a $CO_2$ trap, and a thermoregulation system for both the reactor and the sheath system, there were charged 400 g of perfluoropolyether from $C_3F_6$ having an activated oxygen content equal to 0.75% by weight, and a molecular weight, osmometrically determined, equal to 2,550 u.m.a., i.e., atomic mass units.

10 g of bromine were added and the temperature was brought to 100° C. Subsequently, after lighting of the lamp there were added 20 g of bromine during the test, which lasted overall 15 hours. At the end of the preparation, the reaction mass was discharged into a flask and the residual bromine was distilled under vacuum.

Obtained were 395 g of a product having a mean molecular weight equal to 1,220 u.m.a., practically no oxidation power, and having brominated end groups of the type $R_fOCF_2Br$ and

in the ratio of one brominated end group for each perfluoropolyether chain, the other end group being composed of trifluoromethyl units —O—$CF_3$ or acyl fluorides

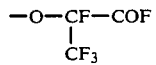

or formyl fluoride

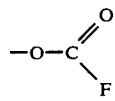

Additive 2: Perfluoropolyether from brominated tetrafluoroethylene with a functionality degree in bromine of about 1.8, having a viscosity of 29.8 cSt at 20° C. and a molecular weight of about 4,500.

Additive 2 was prepared as follows: Into a cylindrical photochemical reactor having a capacity of 300 cc, with an optical path of 0.5 cm, equipped with a coaxial quartz sheath for housing a mercury vapor lamp, type Hanau TQ 150 or a noble gas discharge lamp, for example Xenon, of type PEK, INC X 75, equipped with a magnetic stirrer, a reflux dropping funnel, a $CO_2$ trap, and a thermoregulation system both for the reactor and for the sheath system, there were charged 420 g of perfluoropolyether from tetrafluoroethylene having a peroxy oxygen content (P.O.) of 1.1% by weight, a viscosity of 10,900 cSt (at 20° C.) and an m/n ratio, determined by NMR analysis (19F), equal to 0.95. After addition of 5 ml of $Br_2$, the whole was mixed and the temperature was brought to 110° C. and maintained at this value for 16 hours, in the course of which a further 25 ml of bromine were added. At the end of the reaction, after removal of the bromine there were obtained 397 g of a product having a viscosity of 29.8 cSt (at 20° C.) and a molecular weight, osmometrically determined, equal to 4,500 u.m.a. The functionality, considered as a ratio between brominated end groups of type —$OCF_2Br$, and the sum of the neutral end groups of type —$OCF_3$, —$OCF_2CF_3$ and acid —OCOF, determined from the relevant NMR signals (19F), turned out to be equal to 1.8.

Additive 3: Perfluoropolyether from neutral tetrafluoroethylene having a viscosity of 30 cSt.

The Tests Performed

Detachability test: the mixture was vulcanized in a press at 170° C. for 15 minutes, the test piece was then removed from the mold at 170° C. and the detachability was immediately evaluated on the basis of the percentage of breaks and/or of residue of vulcanized product, if any, adhering to the mold. In Table 1 the detachability is indicated by:

S: (low) if, out of 4 test pieces, all test pieces break and/or leave residues of vulcanized product on the mold; or 1 test piece at the most detaches without breaking and/or leaving residues of vulcanized product on the mold;

D: (fairly good): if, out of 4 test pieces, 2 or 3 test pieces detach without breaking and/or leaving residues of vulcanized product adhering to the mold;

B: (good): if, out of 4 test pieces, all test pieces detach without breaking and/or leaving vulcanized residues adhering to the mold.

Processability test in extruder: The processability was evaluated according to method ASTM D2230/78, which classifies the extrudates both as the extrudate amount in grams per minute (Method B) and as the surface appearance of the Garvey rating (Method A—System B).

Characteristics of the vulcanized test piece obtained: The characteristics were determined on test pieces obtained by vulcanization in a mold at 170° C. for 15 minutes and subsequent postvulcanization in an oven at 250° C. for 16 hours, the postvulcanization being preceded by a temperature rise from 100° C. to 250° C. in 8 hours.

In Table 1, Examples 1, 7 and 9 are comparative examples, namely: Example 1 is to be compared with Examples 2, 3, 4, 5 and 6; Example 7 is to be compared with Example 8; Example 9 is to be compared with Example 10.

From the comparison between the examples of the invention with the additive and those without additive with regard to the thermal stability characteristics, it is not possible to recognize a sure effect of the additive according to the invention, as the variations occurring upon variation of the additive fall within the variability of the measuring method.

TABLE 1

| | | EXAMPLE | | | | | | | | | |
|---|---|---|---|---|---|---|---|---|---|---|---|
| | | 1 | 2 | 3 | 4 | 5 | 6 | 7 | 8 | 9 | 10 |
| ELASTOMER 1 | b. weight | 100 | 100 | 100 | 100 | 100 | 100 | — | — | — | — |
| ELASTOMER 2 | " | — | — | — | — | — | — | 100 | 100 | — | — |
| ELASTOMER 3 | " | — | — | — | — | — | — | — | — | 100 | 100 |
| LUPERCO 101XL$^R$ | " | 3 | 3 | 3 | 3 | 3 | 3 | 3 | 3 | 3 | 3 |
| TAIC | " | 3 | 3 | 3 | 3 | 3 | 3 | 3 | 3 | 3 | 3 |
| PbO | " | 3 | 3 | 3 | 3 | 3 | 3 | 3 | 3 | 3 | 3 |
| BLACK MT | " | 30 | 30 | 30 | 30 | 30 | 30 | 30 | 30 | 30 | 30 |
| ADDITIV 1 | " | — | 0.5 | — | 1.5 | 3 | — | — | 3 | — | — |
| ADDITIV 2 | " | — | — | — | — | — | 3 | — | — | — | 3 |
| ADDITIV 3 | " | — | — | 0.5 | — | — | — | — | — | — | — |
| THERMOMECHANICAL CHARACTERISTICS | | | | | | | | | | | |
| ODR at 180° C. (1) | | | | | | | | | | | |
| Min. torque (inch · lbs) | | 22 | 22 | 22 | 21 | 20 | 20 | 25 | 24 | 17 | 16 |
| ts 10 (sec) | | 79 | 81 | 78 | 81 | 84 | 80 | 84 | 87 | 109 | 111 |
| ts 50 (sec) | | 114 | 120 | 115 | 123 | 132 | 123 | 117 | 133 | 211 | 295 |
| Max. torque (inch · lbs) | | 115 | 108 | 109 | 105 | 98 | 97 | 112 | 98 | 75 | 68 |
| PROCESSABILITY (2) | | | | | | | | | | | |
| yield (a) (g/min) | | 32 | 32 | 32 | 39 | 45 | 49 | 44 | 47 | 26 | 35 |
| Garvey rating (b) | | 6 | 8 | 8 | 9 | 10 | 10 | 9 | 11 | 8 | 8 |
| DETACHABILITY | | S | D | S | B | B | D | S | B | S | D |
| VULCANIZED TEST-PIECE CHARACTERISTICS | | | | | | | | | | | |
| M100 (MPa) (modulus at 100)CR | | 6,1 | 6,2 | 6,2 | 6,1 | 5,0 | 4,9 | 4,0 | 3,1 | 4,3 | 3,9 |
| (MPa) (tensile stress) | | 19,4 | 21,6 | 21,5 | 20,3 | 17,0 | 17,0 | 17,8 | 14,8 | 16,6 | 16,6 |
| AR (%) (elongation at break) | | 216 | 224 | 216 | 216 | 219 | 220 | 278 | 292 | 261 | 261 |
| Hardness, Shore A (points) (4) | | 72 | 75 | 75 | 73 | 70 | 71 | 70 | 70 | 70 | 70 |
| COMPRESSION SET AT 200° C. × 70 h (5) O-ring (%) 25 × 3,53 (in mm) | | 33 | 33 | 34 | 33 | 33 | 33 | 32 | 32 | 48 | 48 |
| CHEMICAL STABILITY in BP Olex (MK 4409) at 150° C. for 7 days (6) | | | | | | | | | | | |
| ΔP (%) | | 0,4 | 0,4 | 0,4 | 0,4 | 0,4 | 0,4 | 0,4 | 0,4 | 3,3 | 3,3 |
| ΔV (%) | | 0,8 | 0,8 | 0,8 | 0,8 | 0,8 | 0,8 | 0,8 | 0,8 | 6,0 | 6,0 |
| THERMAL STABILITY at 275° for 70 h (7) | | | | | | | | | | | |
| ΔCR (%) | | −62 | −43 | −44 | −36 | −60 | −62 | −55 | −36 | −44 | −40 |
| ΔAR (%) | | +44 | +41 | +31 | +35 | +59 | +57 | −34 | −34 | +16 | +1 |
| ΔHardness (points) | | −1 | −2 | −2 | −2 | −1 | −1 | −1 | −2 | −7 | −5 |

(1) ASTM D-2084
(2) ASTM D-2230 - 78 (a) Method B, (b) Method A - System B
(3) ASTM D-412
(4) ASTM D-2240
(5) ASTM D-395 Method B
(6) ASTM D-471
(7) ASTM D-573

What is claimed is:

1. A composition containing a peroxide and a rubber or a rubber mixture vulcanizable by means of a peroxidic or a mixed peroxidic and ionic vulcanizing system having improved processability properties, said rubber and rubber mixture being selected from the group consisting of:

(a) copolymers of $CH_2=CF_2$ with $C_3F_6$, and optionally $C_2F_4$, containing peroxy crosslinking sites;

(b) copolymers of $C_2F_4$ with propylene;

(c) copolymers of $C_2F_4$ with perfluoroalkylperfluorovinylethers, containing peroxy crosslinking sites;

(d) terpolymers of $CH_2=CF_2$, $C_3F_6$, and a perfluoroalkylperfluorovinyl ether, containing peroxy crosslinking sites;

(e) a mixture of a fluoroelastomer based on $CH_2=CF_2$ and a copolymer of $C_2F_4$ with $C_3H_6$;

said composition comprising, as processing co-adjuvant, a brominated additive, in amounts ranging from 0.01 to 5 parts by weight of rubber or rubber mixture or a non-brominated additive, in amounts ranging from 0.5 to 1 part by weight of rubber or rubber mixture or a mixture of a brominated additive in the aboversaid amount with a non-brominated additive, in the above-said amount, each of said additives having a mean molecular weight ranging from 500 to 10,000; the brominated additive being selected from compounds of formula

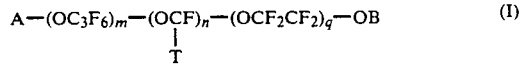

$$A-(OC_3F_6)_m-(OCF)_n-(OCF_2CF_2)_q-OB \quad (I)$$
$$\qquad\qquad\qquad\quad |$$
$$\qquad\qquad\qquad\quad T$$

in which: $T=F$ or $CF_3$; m, n and q are integers including zero; $m+n+q$ are between 2 and 200; $m/(n+q) \leq 50$ when n and/or q are different from zero; when $m=0$, $q/n$ is $\geq 0.2$ and $\leq 20$ when n is different from zero; when $q=0$, $m/n$ ranges from 1 to 50 when n is different from zero; A and B, either like or unlike each other, consist of a group selected from $-CF_2X$, $-CF_2-CF_2-X$,

$$-CF-X,$$
$$\;\;|$$
$$\;\;CF_3$$

—CF$_2$—CFX—CF$_3$, —COF, —CF$_2$—COF, and

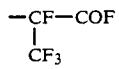

X being bromine or fluorine, when m is different from 0, X is bromine only in A or in B;

the non-brominated additive being selected from:
  (a) non-brominated compounds of formula (I) wherein X is fluorine; and
  (b) F(CF$_2$CF$_2$CF$_2$O)$_n$—CF$_2$CF$_3$ (II) where n is an integer greater than 2 and lower than 200;

the mixture of a brominated additive with a non-brominated additive being selected from the mixture of the brominated additive of formula (I) where X is bromine or fluorine with the non-brominated additive of formula (I) where X is fluorine and the mixture of the brominated additive of formula (I) where X is bromine or fluorine with non-brominated additive of formula (II).

2. A composition containing a peroxide and a rubber or a rubber mixture vulcanizable by means of a peroxidic or a mixed peroxidic and ionic vulcanizing system having improved processability properties, said rubber and rubber mixture being selected from the group consisting of:
  (a) copolymers of CH$_2$=CF$_2$ with C$_3$F$_6$ and optionally C$_2$F$_4$, containing peroxy crosslinking sites;
  (b) copolymers of C$_2$F$_4$ with propylene;
  (c) copolymers of C$_2$F$_4$ with perfluoroalkylperfluorovinylethers, containing peroxy crosslinking sites;
  (d) terpolymers of CH$_2$=CF$_2$, C$_3$F$_6$, and a perfluoroalkylperfluorovinyl ether, containing peroxy crosslinking sites;
  (e) a mixture of a fluoroelastomer based on CH$_2$=CF$_2$ and a copolymer of C$_2$F$_4$ with C$_3$H$_6$;

said composition comprising, as processing co-adjuvants, brominated additives, in amounts ranging from 0.01 to 5 parts by weight per 100 parts by weight of rubber or rubber mixture, said co-adjuvant having a mean molecular weight ranging from 500 to 10,000 and having the formula:

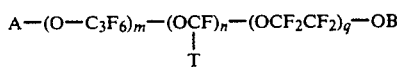   (I)

in which: T=F or CF$_3$; m, n and q are integers including zero; m+n+q are between 2 and 200; m/(n+q)$\leq$50 when n and/or q are different from zero; when m=0, q/n is $\geq$0.2 and $\leq$20 when n is different from zero; when q=0, m/n ranges from 1 to 50 when n is different from zero; A and B, either like or unlike each other, consist of a group selected from —CF$_2$X, —CF$_2$—CF$_2$—X,

—CF$_2$—CFX—CF$_3$, —COF, —CF$_2$—COF, and

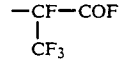

X being bromine or fluorine; when m is different from 0, X is bromine only in A or in B.

3. A composition according to claim 2, in which the co-adjuvant is

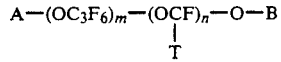

wherein T=F or CF$_3$; m and n are integers; m+n ranges from 2 to 200; m/n ranges from 1 to 50; and A and B, either like or unlike each other, are —CF$_2$Br,

—CF$_3$,

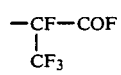

or —COF.

4. A composition according to claim 2, in which the rubber is a copolymer of CH$_2$=CF$_2$, C$_3$F$_6$ and optionally C$_2$F$_4$, containing peroxy crosslinking sites, and the co-adjuvant is

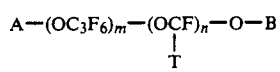

wherein T=F or CF$_3$; m and n are integers; m+n ranges from 2 to 200; m/n ranges from 1 to 50; and A and B, either like or unlike each other, are —CF$_2$Br,

—CF$_3$,

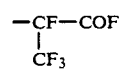

or —COF.

5. A composition according to claim 2 in which the co-adjuvant is used in amounts up to 3 parts by weight per 100 parts of rubber or rubber mixture when the molecular weight is $\geq$2,500, and up to 1.5 parts by weight when the molecular weight is <2,500.

6. A composition according to claim 2 wherein the rubber is a copolymer of CH$_2$=CF$_2$, C$_3$F$_6$ and optionally C$_2$F$_4$, containing peroxy crosslinking sites.

* * * * *